W. Sellers
Railroad Turn-Table
No. 5822.
Reissued Aug. 10, 1858.
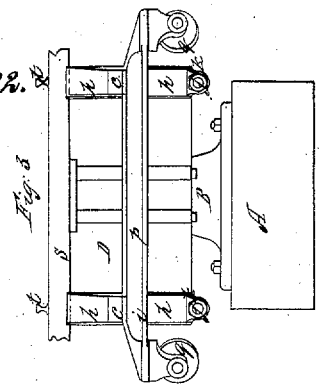
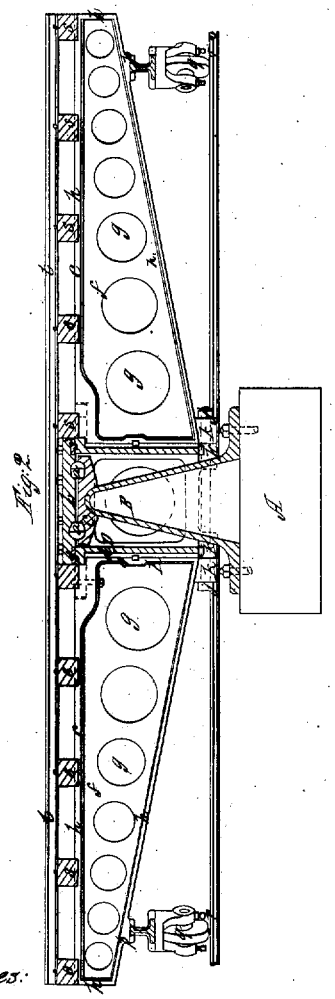
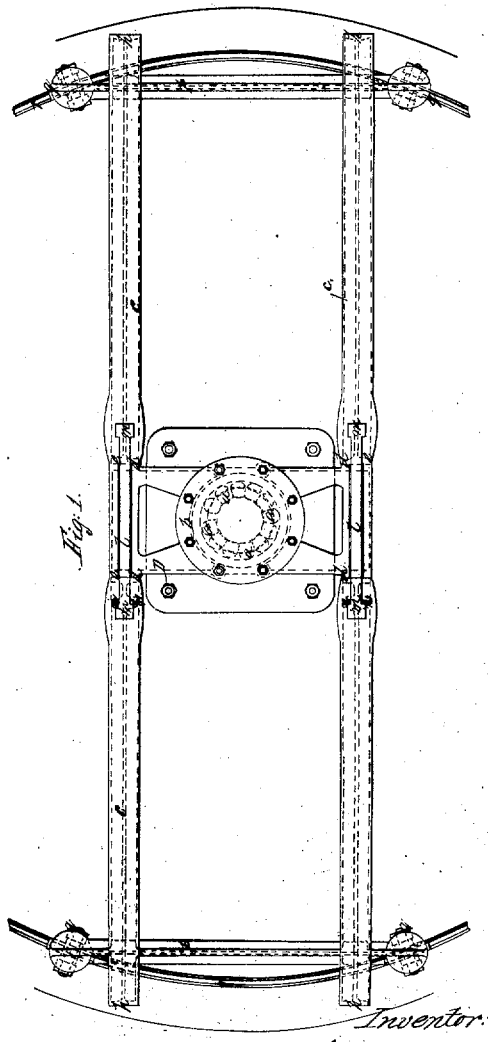
Witnesses:
Wm H Bishop
Ch. Wkella
Inventor:
William Sellers
N. PETERS, PHOTO-LITHOGRAPHER, WASHINGTON, D. C.

UNITED STATES PATENT OFFICE.

W. SELLERS, OF PHILADELPHIA, PENNSYLVANIA.

IMPROVEMENT IN TURNING AND SLIDING TABLES FOR RAILROADS.

Specification forming part of Letters Patent No. 19,718, dated March 23, 1858; Reissue No. 582, dated August 10, 1858.

*To all whom it may concern:*

Be it known that I, WILLIAM SELLERS, of Philadelphia, in the State of Pennsylvania, have invented a new and useful Improvement in the Construction of Cast-iron Turning and Sliding Tables for Railroads, of which the following is a full, clear, and exact description, reference being had to the accompanying drawings, making part of this specification, in which—

Figure 1 is a plan of my invention as applied to the construction of a turning-table; Fig. 2, a longitudinal vertical section; and Fig. 3, an end elevation thereof. Fig. 4 is a plan of the same as applied to a sliding table; Fig. 5, a longitudinal vertical, and Fig. 6 a cross vertical section thereof.

The same letters indicate like parts in all the figures.

In order that a table, whether turning or sliding, may work well, it is necessary that at the time of turning or sliding it should rest exclusively on its central support, whether such central support be a central pivot on which to turn or large wheels to run on rails in the pit, so that the load may be balanced and leave the ends of the beams, which carry the load, clear of all support, except from the central part; but in view of the large size of locomotives and tenders now used on railroads, turning and sliding tables are required to be of very great size and strength to present the required length of rails and the strength to sustain the weight which they have to carry. And again, it is very important that such tables should be so constructed that they may be readily taken apart and put together with the view to transportation, as they cannot be readily made where they are used, and when put down during the progress of the road change of terminus often requires them to be removed from place to place.

By my mode of construction I avoid all the serious defects heretofore experienced in the use of sliding and turning tables, and I have attained what has long been desired.

In Figs. 1, 2, and 3 of the accompanying drawings, A represents a firm base, on which is secured a conical pedestal, pintle, or pivot, B, on which rests and turns the turning-table. Between this pedestal and the turning-table may be interposed what is known as "Parry's Friction-Box," with double conical rollers *a* interposed between two plates, *b* and *c*, the upper one being bolted to the top, and the under one, with a rounded socket, resting on the rounded end of the pedestal, so that the table can tip or vibrate in vertical planes on the central pedestal, while the whole can turn freely by the interposition of rollers between the two plates.

The turning-table is composed of the central part or box, D, and four truss-beams, *c c c c*. The central part or box, D, is cast in a single piece and hollow to fit over the pedestal or pintle B. It is quadrangular in form, with the several sides at right angles. It has four faces, *d d d d*, two on each of two opposite sides and at the ends. These faces project but slightly from the faces of the box D, and their surfaces are made parallel and accurate by planing. To each one of these faces is fitted the inner end, *e*, of one of the four truss-beams *c*. These truss beams are cast each in one piece, consisting of a thin plate, F, tapering from the inner end, *e*, to the outer end with holes *g*, to reduce the weight, and with a flange like border, *h*, all around on both sides to give the required strength to resist the tensile and crushing forces to which the beams are exposed when heavy locomotives pass over and rest on them. The inner end, *e*, is properly faced to fit against one of the faces *d* of the central part, so that when the four beams are secured their upper edges will be in the horizontal plane of the top of the central part, D, and form two parallel lines corresponding with the gage of the road, so that the rails can be secured thereon as on the bed of the road. The beams are firmly secured in pairs to the central part at bottom by strong screw-bolts *j*, which pass each through holes in projecting ears *k k k k*, one on each beam, and two on the central part and at the top by straps *l l*, one strap extending entirely across from one beam to the other, and let into grooves in the upper surface of the beams and central part, the strap having a head, *m*, at each end. After the strap has been inserted in the groove so as to be flush with the upper surface of the beams and central part, the whole is drawn tight by keys *n n*, driven in between one of the heads of the straps and the shoulder of the groove. The upper surface of the beams and the central part are maintained on a level by keys *o o*, inserted in holes formed by cross-grooves in the faces *d d d d* of the central part and the face at the inner end of the beams. The outer end of the two beams on each side are connected by a cross-bar, *p'*, bolted on the under edge of the beams, or may be both cast together, and the ends of the two bars *p p* are provided with rollers or wheels *q q*, placed over a concentric rail, *r*, but without touching, except when by accident the load on the table is slightly out of balance. Cross beams or joists *s*, with their under surfaces notched out, are laid across and let down onto the upper edge of the beams *c c c c* and there secured, and on these cross-joists are then properly secured the rails *t t*, as also the floor or table, to constitute a turn-table. The cap-plate *b* is bolted to the top of the central part or box, D, which is flanged for that purpose; and between the flanged upper edge of the box D and the cap plate I interpose a lamina of wood, *s'*, which can be at any time varied in thickness to adjust the level of the table to the level of the track.

From the foregoing it will be seen that by the manner of forming the central piece and the four truss-beams so that they can each be cast in a single piece, readily and accurately fitted to each other, and by the peculiar manner of uniting and adjusting them, a metallic turning table or platform can be produced at very little cost, and much more durable and permanent than those heretofore constructed, while at the same time the parts can be readily taken to pieces and put together at very little cost, thereby adapting it particularly to new roads, as the tables can be transferred to each successive terminus as the road progresses. The level of the rails on the table should be slightly above the level of the rails on the main track to the same extent that the sustaining-wheels *q* under the ends of the beams are above the circular rail *r*, so that when a locomotive or other weight runs onto the rails of the table they shall be brought down to the required level, and there held by the sustaining-wheels *q* and rail *r* until the locomotive or other weight is brought to the required position to balance on the table, when the sustaining-wheels are relieved from the rail, and then the table will be free to move on its central support.

When the mode of construction above described is applied to a sliding table or platform, (represented in Figs. 4, 5, and 6,) instead of sustaining the central part on a pedestal or pintle, the ends of the central part, D, are extended on each side of the pairs of the truss-beams *c c* to receive the journals of the axles *u u* of four flanged wheels, *v v v v*, which run on cross-rails *w w* on the base A, by which the whole structure is sustained, and on which it runs to shift a locomotive or cars from one track to another; and on one side the central part, D, is extended sufficiently to receive the journals of two shafts, *x* and *y*, which carry cog-wheels and pinions *z z z z*, by which motion is imparted to the axle of one of the pairs of flange-wheels, so that by turning the shaft *x* by crank-handles *a' a'* the whole sliding table can be shifted.

From the foregoing it will be seen that the central part or box, which is supported on the pedestal or on wheels, is interposed between the beams, makes part of the entire length or diameter of the table, and by the mode of connection forms the entire support of the truss-beams, which are thus enabled to sustain the entire load while turning or sliding without the necessity for end support, while at the same time, by making the truss-beams and central part separate and connecting them in the manner described, tables so constructed can be readily taken apart for ease of transportation and put together again at very little cost and with very little labor.

I am aware that it has been proposed to construct turn-tables of metal with a central hub interposed between beams sustaining the rails; but in such case the beams were not truss-beams, nor were they so connected with the central hub as to sustain the load without end bearing-wheels resting and running on a rail, so that in turning the load was sustained on the end wheels and the central pivot, which mode requires too much power to operate in practice.

What I claim as my invention, and desire to secure by Letters Patent, is—

Interposing the central part or box between the ends of the truss-rail beams in such manner as to make use of the width of said central part or box as a portion of the length of the said beams, substantially as described, when the said beams and central box are so constructed and connected as to form a table entirely supported from the central part or box, substantially as described.

WILLIAM SELLERS.

Witnesses:
JOS. B. HOUGH,
COLEMAN SELLERS.